(12) United States Patent
Specha

(10) Patent No.: US 12,196,040 B2
(45) Date of Patent: *Jan. 14, 2025

(54) ANIMAL CLIMBING COVER FOR LADDERS

(71) Applicant: Alex Specha, Surprise, AZ (US)

(72) Inventor: Alex Specha, Surprise, AZ (US)

(*) Notice: Subject to any disclaimer, the term of this patent is extended or adjusted under 35 U.S.C. 154(b) by 134 days.

This patent is subject to a terminal disclaimer.

(21) Appl. No.: 17/893,284

(22) Filed: Aug. 23, 2022

(65) Prior Publication Data

US 2022/0397001 A1 Dec. 15, 2022

Related U.S. Application Data

(63) Continuation-in-part of application No. 17/182,288, filed on Feb. 23, 2021, now Pat. No. 11,452,279.

(60) Provisional application No. 62/990,520, filed on Mar. 17, 2020.

(51) Int. Cl.
   *E06C 7/00* (2006.01)
   *A01K 1/035* (2006.01)

(52) U.S. Cl.
   CPC ........ *E06C 7/00* (2013.01); *A01K 1/035* (2013.01)

(58) Field of Classification Search
   CPC .......... A01K 1/035; A01K 29/00; E06C 7/00; E06C 7/006; E06C 7/082; E06C 7/08; E06C 7/081; E06C 5/44; E04H 4/06; E04H 4/144
   USPC ........................................ 119/847
   See application file for complete search history.

(56) References Cited

U.S. PATENT DOCUMENTS

| | | | | |
|---|---|---|---|---|
| 2,958,872 A * | 11/1960 | Meyer, Jr. | ........... | E04H 4/10 |
| | | | | 5/199 |
| 3,311,195 A * | 3/1967 | Singer | ........... | E06C 1/18 |
| | | | | 182/230 |
| 4,181,195 A * | 1/1980 | Clarke | ........... | E06C 7/006 |
| | | | | 182/230 |
| 5,499,692 A * | 3/1996 | Brook | ........... | E06C 9/14 |
| | | | | 182/206 |
| 5,682,960 A * | 11/1997 | Mobley | ........... | E06C 7/00 |
| | | | | 182/129 |
| D793,024 S * | 7/2017 | Bernart | ........... | D34/32 |
| 11,452,279 B2 * | 9/2022 | Specha | ........... | A01K 1/035 |
| 2006/0286901 A1 * | 12/2006 | Cremer | ........... | A41F 1/006 |
| | | | | 450/58 |
| 2007/0074932 A1 * | 4/2007 | Mutscheller | ........... | E06C 7/00 |
| | | | | 182/107 |
| 2010/0044152 A1 * | 2/2010 | Lipniarski | ........... | E06C 7/006 |
| | | | | 182/112 |
| 2010/0170749 A1 * | 7/2010 | Leung | ........... | E06C 1/26 |
| | | | | 182/129 |
| 2011/0056519 A1 * | 3/2011 | Card | ........... | B65D 90/06 |
| | | | | 220/9.4 |
| 2011/0072574 A1 * | 3/2011 | Hsiang Lin | ........... | E04H 4/144 |
| | | | | 4/504 |
| 2012/0125714 A1 * | 5/2012 | Allam | ........... | E06C 7/006 |
| | | | | 182/129 |

(Continued)

*Primary Examiner* — Brady W Frazier
*Assistant Examiner* — Zoe Tam Tran
(74) *Attorney, Agent, or Firm* — Bruce A. Lev

(57) ABSTRACT

A removable and safe covering adapted to be placed over the entire length of an existing ladder thereby covering the rungs and the spaces therebetween and providing a surface for animals to be able to traverse upwards and downwards along the length of the ladder without falling between the rungs and becoming injured.

20 Claims, 10 Drawing Sheets

(56) References Cited

U.S. PATENT DOCUMENTS

| | | | |
|---|---|---|---|
| 2015/0074924 A1* | 3/2015 | Bernart | B65G 69/30 |
| | | | 14/69.5 |
| 2017/0152708 A1* | 6/2017 | Lin | E04H 4/144 |
| 2020/0093099 A1* | 3/2020 | Pollack | A47C 12/00 |

* cited by examiner

ANIMAL CLIMBING COVER FOR LADDERS

CROSS-REFERENCE TO RELATED APPLICATION

The present application is related to and claims priority from prior provisional application Ser. No. 62/990,520, filed Mar. 17, 2020, and non-provisional application Ser. No. 17/182,288, filed Feb. 23, 2021, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of coverings for ladders that aid in the ability for animals to traverse up and down them without injury.

2. Description of the Related Art

Animals, especially dogs, are able to climb ladders. However, because of the shapes of their paws, the shapes of the rungs of the ladders, and the materials ladder rungs are made of, they slip often on the rungs and even simply miss hitting the rungs with their paws and fall between the rungs and become injured very easily and often.

Thus, a need exists for a reliable and removable ladder covering that will allow animals to traverse up the rungs of the ladders in a safe manner to avoid the above-mentioned problems.

BRIEF SUMMARY OF THE INVENTION

In view of the foregoing disadvantages inherent in known ladders, the present invention provides a novel covering for ladders. The general purpose of the present invention, which will be described subsequently in greater detail, is to provide a removable and safe covering adapted to be placed over the entire length of an existing ladder thereby covering the rungs and the spaces therebetween and provide a surface for animals to be able to traverse upwards and downwards along the length of the ladder without falling between the rungs and becoming injured.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Animal Climbing Cover for Ladders, constructed and operative according to the teachings of the present invention.

Figure 1:
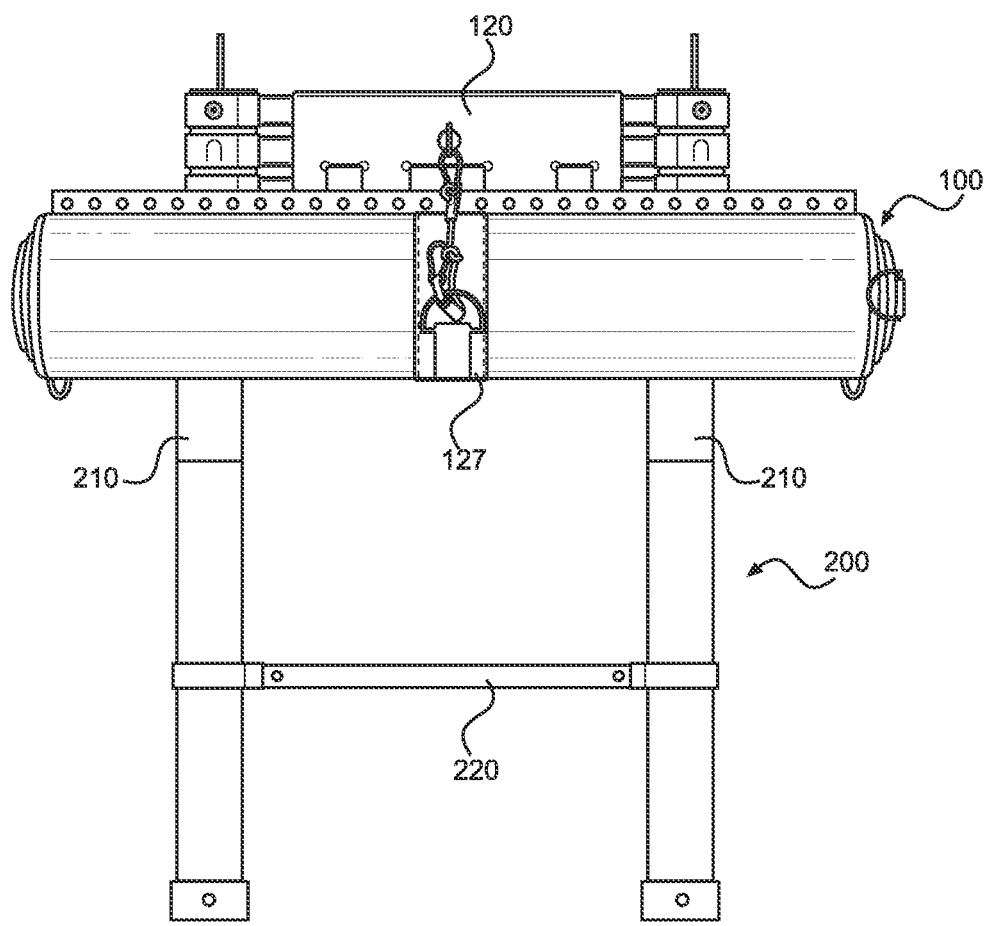
FIG. 1 shows a front view illustrating the Animal Climbing Cover for Ladders attached to a top rung of a ladder in a rolled up configuration according to an embodiment of the present invention.
Figure 2:
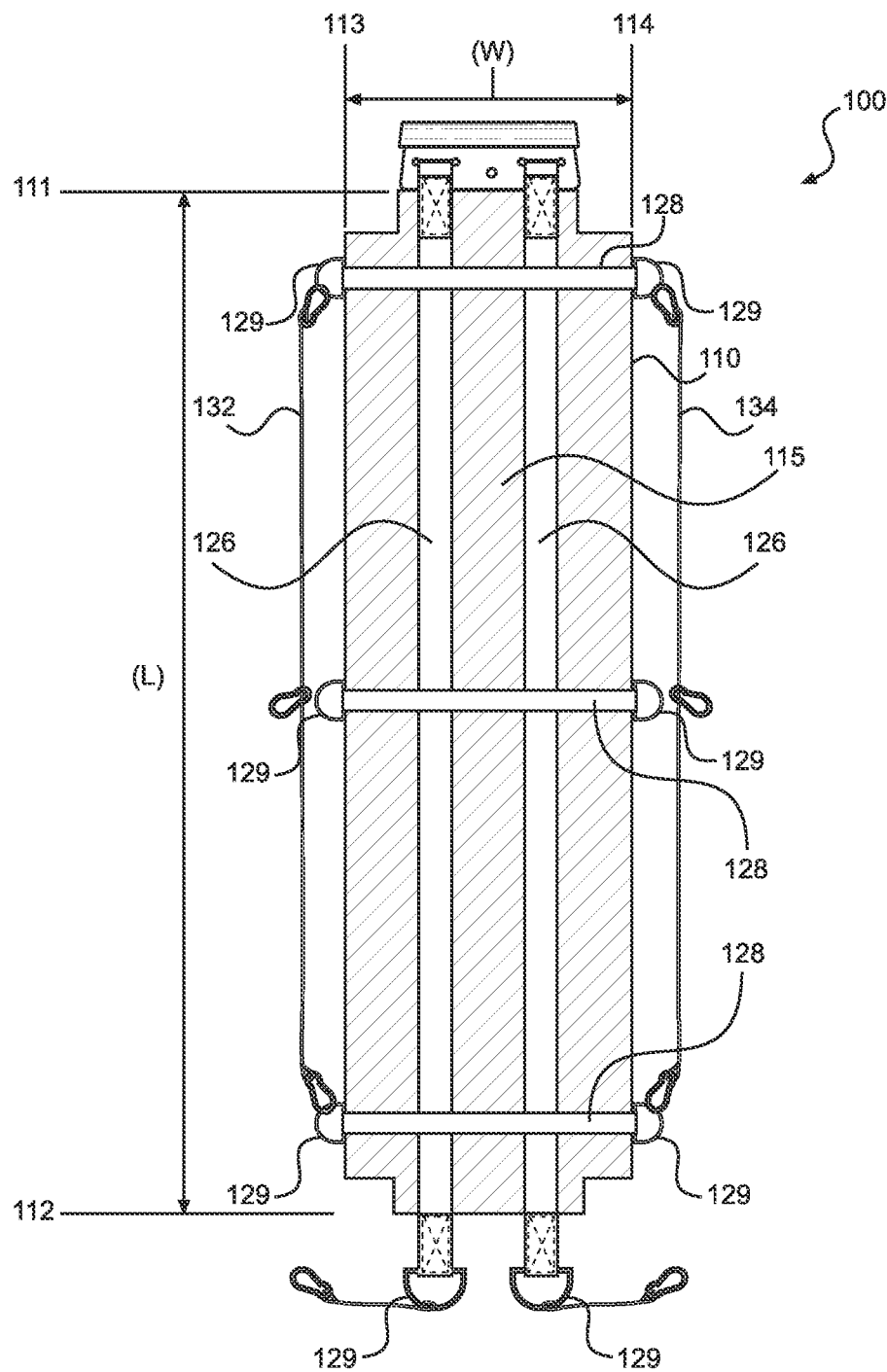
FIG. 2 shows a bottom view illustrating the Animal Climbing Cover for Ladders according to the embodiment of the present invention of FIG. 1.

The various embodiments of the present invention will hereinafter be described in conjunction with the appended drawings.

DETAILED DESCRIPTION

As discussed above, embodiments of the present invention relate to a removable and safe covering adapted to be placed over the entire length of an existing ladder thereby covering the rungs and the spaces therebetween and provide a surface for animals to be able to traverse upwards and downwards along the length of the ladder without falling between the rungs and becoming injured.

Referring now to the drawings FIGS. 1-7, the animal climbing cover for ladders 100 is used in combination with ladders 200 having two spaced side rails 210 and a plurality of spaced rungs 220 connected therebetween, and includes a main panel 110 comprising a top edge portion 111, a bottom edge portion 112, wherein the distance between the top edge and the bottom edge portions defines a length (L) of the main panel, two opposite side edge portions (113 and 114) extending along the length of the main panel, wherein the distance between said two opposite side edge portions defines a width (W) of said main panel, a top surface 116 extending between the top edge portion 111, the bottom edge portion 112, and the two opposite side edge portions, a bottom surface 115 extending between the top edge portion, the bottom edge portion, and the two opposite side edge portions, a plurality of raised portions (117 and 118) located at various positions upon the top surface 116 of the main panel and are adapted to provide a means for animals 300 to grip the main panel with their paws. The main panel 110 is sized, shaped, and adapted to cover a substantial portion of the side rails 210 and rungs 220 of the ladder 200. The animal climbing cover for animals further comprises at least one attachment bracket 120 attached to the top edge portion 111 of the main panel 110 via at least two spaced straps 122 connected therebetween via stitching a slots and is adapted to releasably and securely engage a top rung of the ladder; and at least one attachment strap 124 attached to the bottom edge portion 112 of the bottom surface 115 of the main panel 110 that is adapted to releasably and securely engage bottom rungs 220 of the ladder via a flexible cord 125, wherein the animal climbing cover is adapted to removably attach to and cover a substantial portion of the rungs 220 and the rails 210 of the ladder 200 and provide a means for an animal 300 to climb up and down the ladder.

The animal climbing cover for ladders 100 further comprises at least one vertical strap 126 including a first end adjacent to the top edge portion 111 of the main panel 110, and a second end opposite the first end adjacent the bottom edge portion 112 of the main panel 110, wherein the at least one vertical strap is attached to the bottom surface of the main panel and extends along a substantial portion of the length of the main panel, and wherein the at least one vertical strap is adapted to increase the rigidity of the main panel when in use. The attachment strap 124 can also be attached to the second end of the at least one vertical strap 126 for additional strength.

Figure 3:
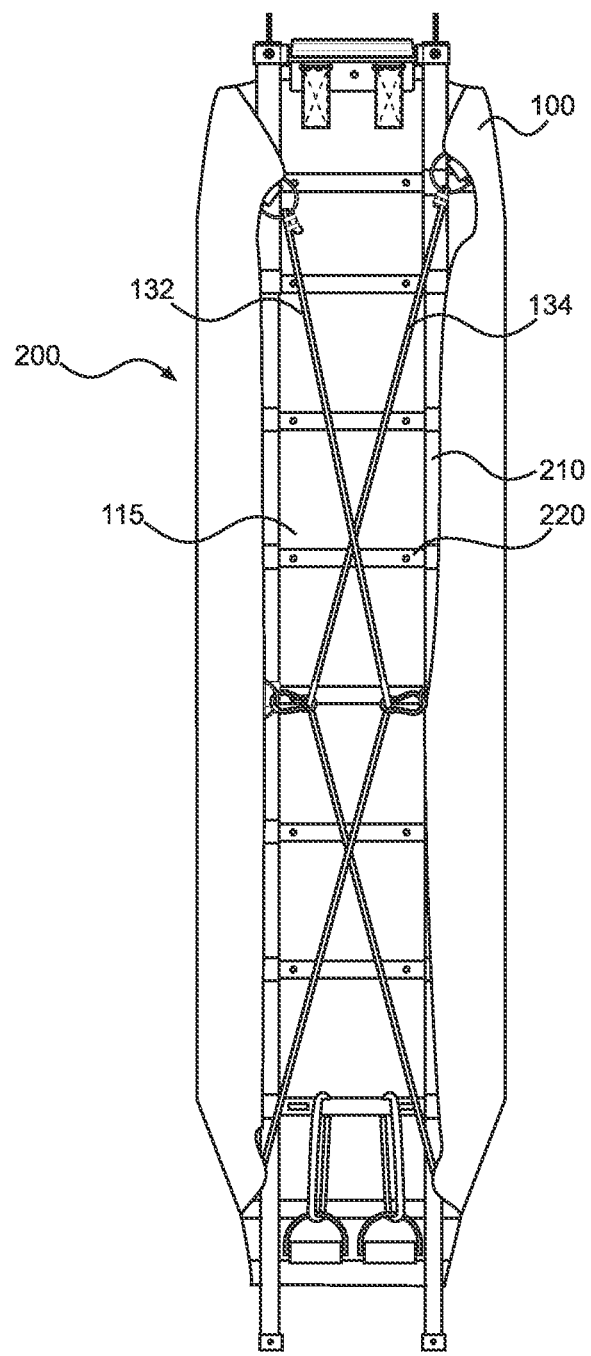
FIG. 3 shows a bottom perspective view illustrating the Animal Climbing Cover for Ladders attached to a ladder and ready for use according to the embodiment of the present invention of FIG. 1.
Figure 4:
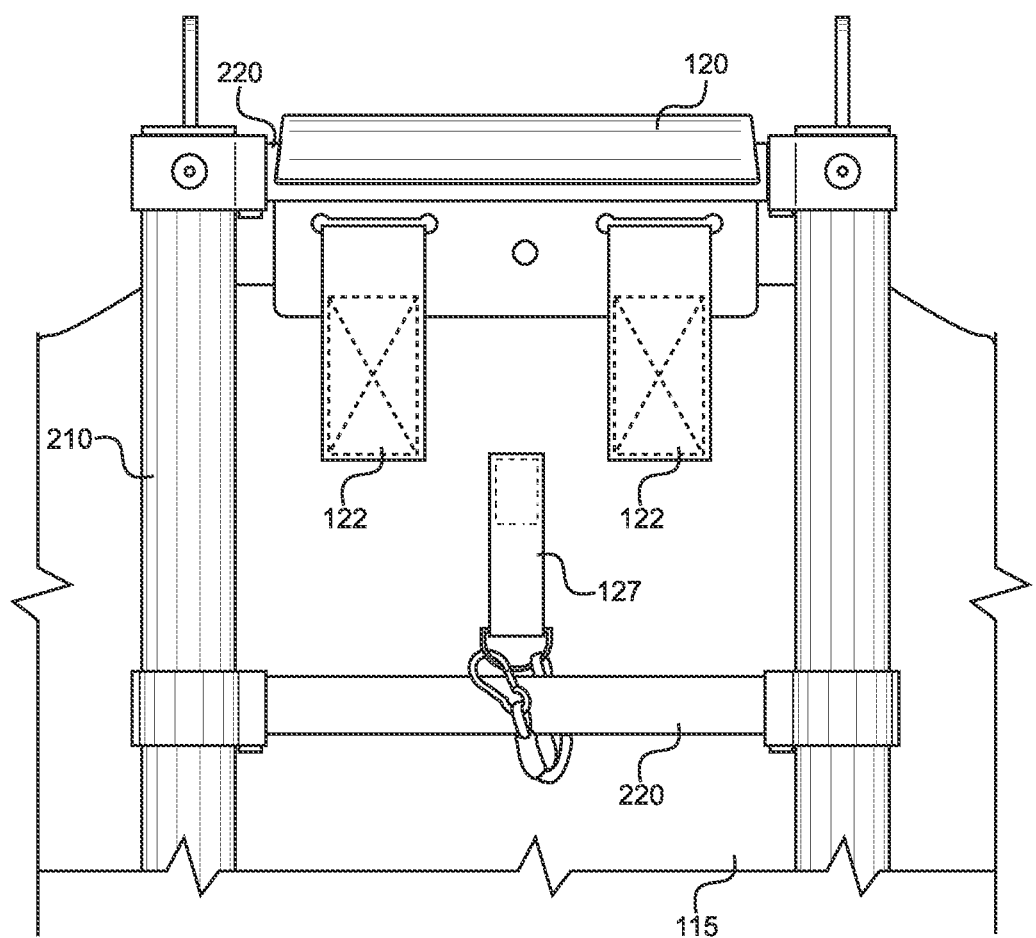
FIG. 4 shows a bottom view illustrating the Animal Climbing Cover for Ladders attached to the top two rungs of a ladder according to the embodiment of the present invention of FIG. 1.
Figure 5:
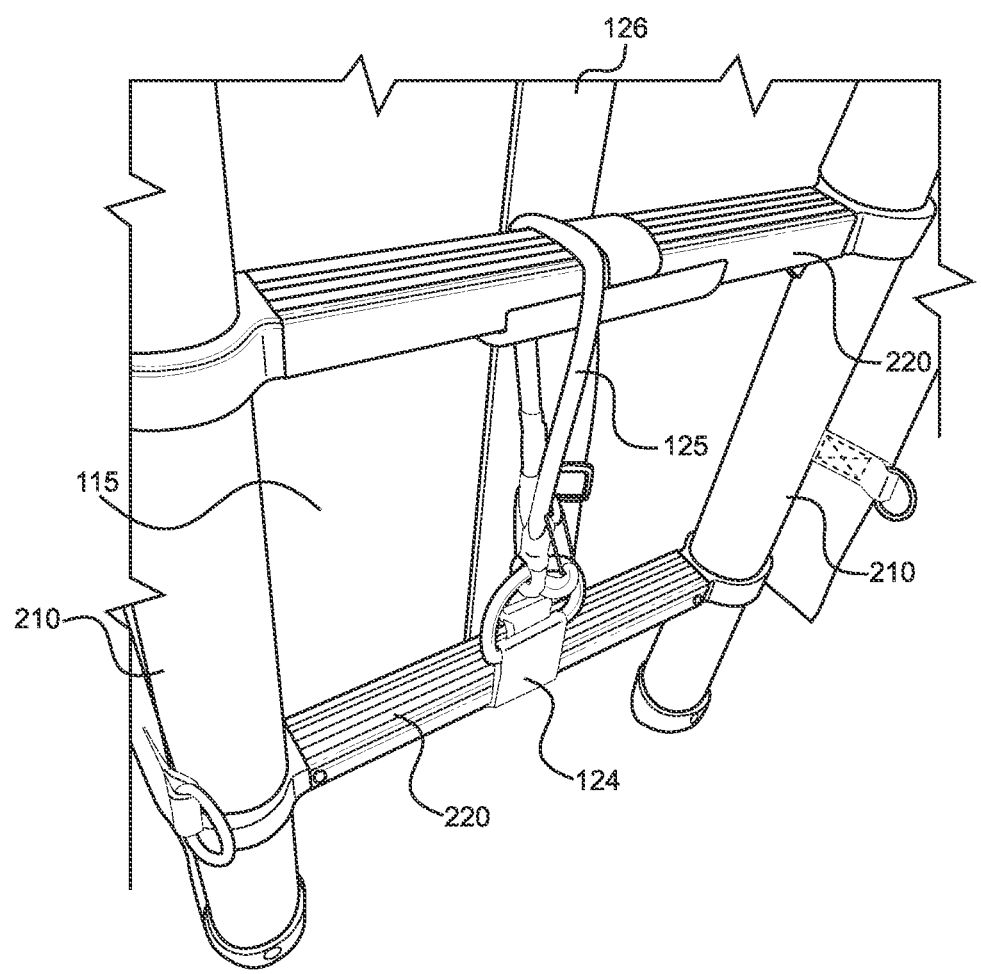
FIG. 5 shows a bottom perspective view illustrating the Animal Climbing Cover for Ladders connected to the bottom rungs of a ladder according to the embodiment of the present invention of FIG. 1.
Figure 6:
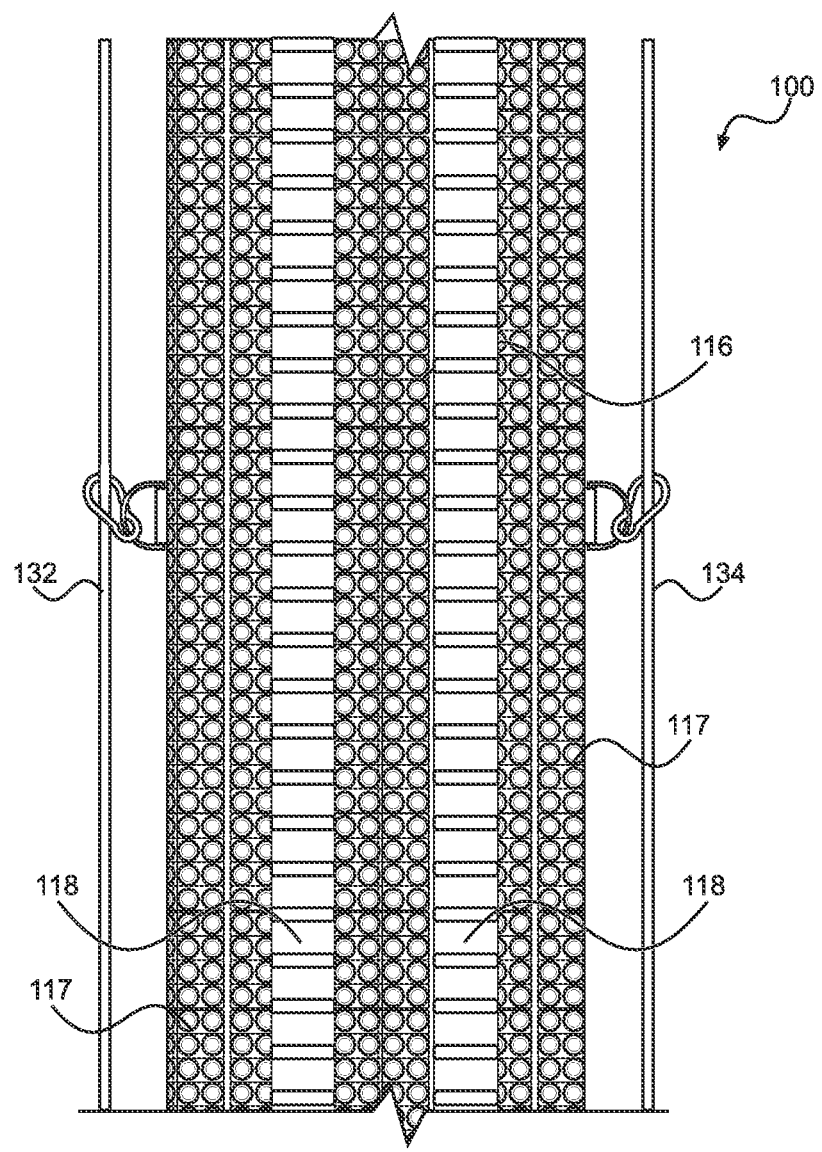
FIG. 6 shows another bottom view illustrating the Animal Climbing Cover for Ladders incorporating raised bumps and ridges according to the embodiment of the present invention of FIG. 1.
Figure 7:
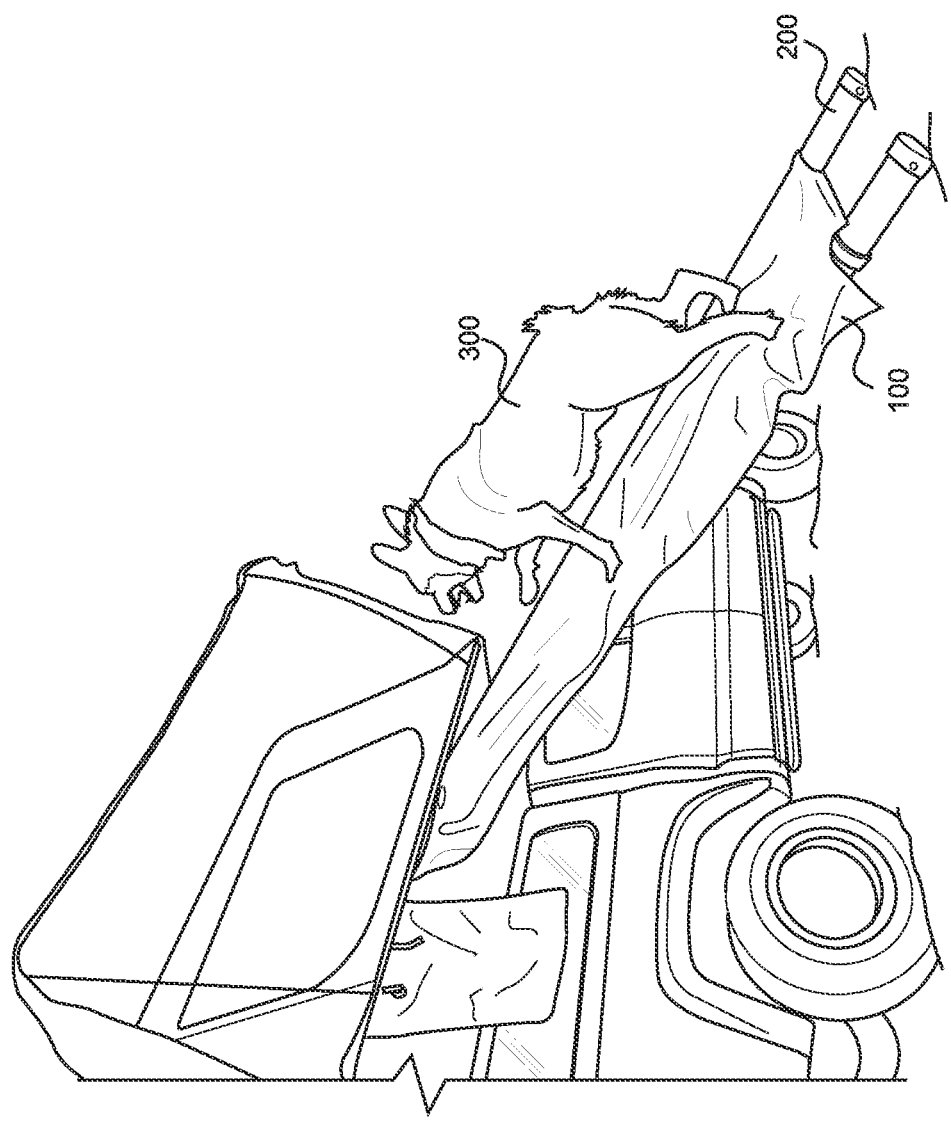
FIG. 7 shows a perspective view illustrating an animal traversing upwards along the length of a ladder using the Animal Climbing Cover for Ladders according to the embodiment of the present invention of FIG. 1.

The animal climbing cover for ladders further comprising a plurality of spaced horizontal straps 128, each including a first end, a second end opposite said first end, a ring 129 attached to the first end, and a ring 129 attached to the second end, wherein the plurality of spaced horizontal straps 128 are attached to the bottom surface 115 of the main panel 110 spaced from one another, and wherein the plurality of spaced horizontal straps 128 have a length larger than the width (W) of the main panel 110, such that the first and second ends extend respectively past the two opposite side edge portions (113 and 114); a first side flexible cord 132 including a first end connected to the ring 129 on the first end of one of the plurality of horizontal straps 128 adjacent the top edge portion 111 of the main panel, a second end connected to the ring 129 on the first end of one of the plurality of horizontal straps 128 adjacent the bottom edge portion of the main panel, and a center portion adapted to be releasably connected to the ring 129 on the second end of one of the plurality of horizontal straps 128 in between the one of the plurality of horizontal straps 128 adjacent the top edge portion of the main panel 110 and the one of the plurality of horizontal straps 128 adjacent the bottom edge portion 112 of the main panel 110; and a second side flexible cord 134 including a first end connected to the ring 129 on the second end of one of the plurality of horizontal straps 128 adjacent the top edge portion 111 of the main panel 110, a second end connected to the ring 129 on the second end of one of the plurality of horizontal straps 128 adjacent the bottom edge portion 112 of the main panel, and a center portion adapted to be releasably connected to the ring 129 on the first end of one of the plurality of horizontal straps 128 in between the one of the plurality of horizontal straps 128 adjacent the top edge portion 111 of the main panel 110 and the one of the plurality of horizontal straps 128 adjacent the bottom edge portion 112 of the main panel 110, wherein the plurality of spaced horizontal straps 128 and the first and second side flexible cords (132 and 134) are adapted to crisscross, as shown in FIG. 3, and be used such that the animal climbing cover is more securely removably attached to the ladder 200.

The main panel 110 may be formed from a material chosen from a group of materials consisting of plastic, burlap, fiberglass, rubber, and copper strands. The main panel 110 may also be formed from a material that is flexible and stretchable. The rings 129 attached to respective ends thereof may be formed as D-rings that may also be formed as carabiner spring clips. There may also be a plurality of spaced vertical straps 126 attached to the bottom surface 115 of the main panel 110. The at least one attachment bracket 120 may be formed having an L-shaped cross-section, or formed as an S-hook, and may include set screws.

The plurality of raised portions (117 and 118) may be formed having a shape chosen from a group of shapes consisting of bumps and ridges, and be located on the top surface 116 of the main panel 110 in a pattern, such as two spaced vertical strips.

The vertical and horizontal straps (126 and 128) may be formed from nylon webbing. The flexible cords (132 and 134) may be formed from parachute cording. Other straps and attachment means can be incorporated to further releasably attach the main panel to the side rails and rungs.

As shown in FIG. 1 the animal climbing cover for ladders 100 can be rolled up in a storage configuration and be held therein by a strap 127 connected between the attachment bracket 120 and the bottom surface 115 of the main panel 110. Once installed upon the top rung 220 of the ladder 200 the strap can be disconnected and the animal climbing cover for ladders 100 can be unrolled and connected to the ladder. Further, strap 127 can be connected to one of the rungs 220 of the ladder 200 adjacent the top rung 220 for additional attachment security.

Figure 8:
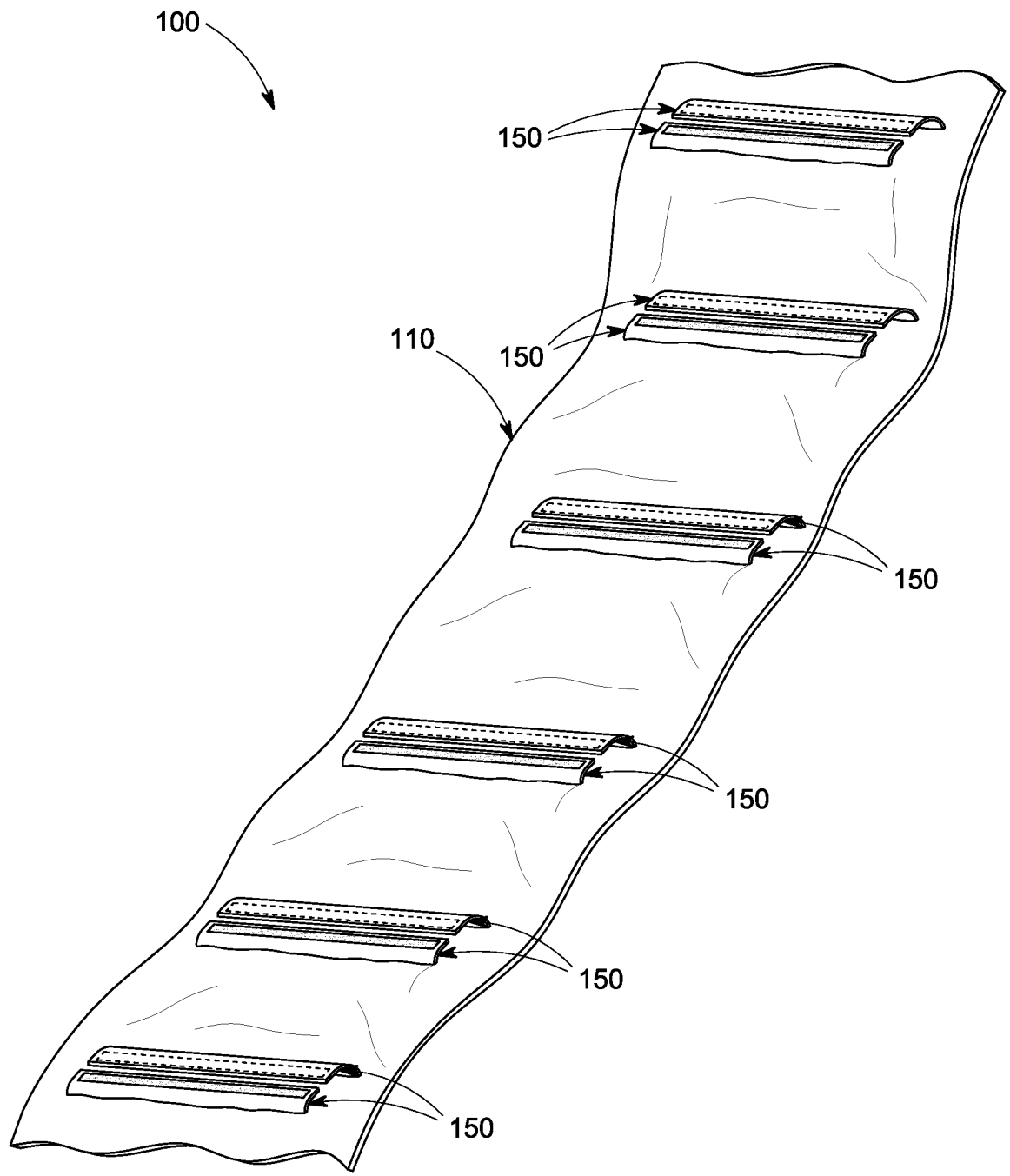
FIG. 8 shows a perspective bottom view illustrating the Animal Climbing Cover for Ladders according to an alternate embodiment of the present invention.
Figure 9:
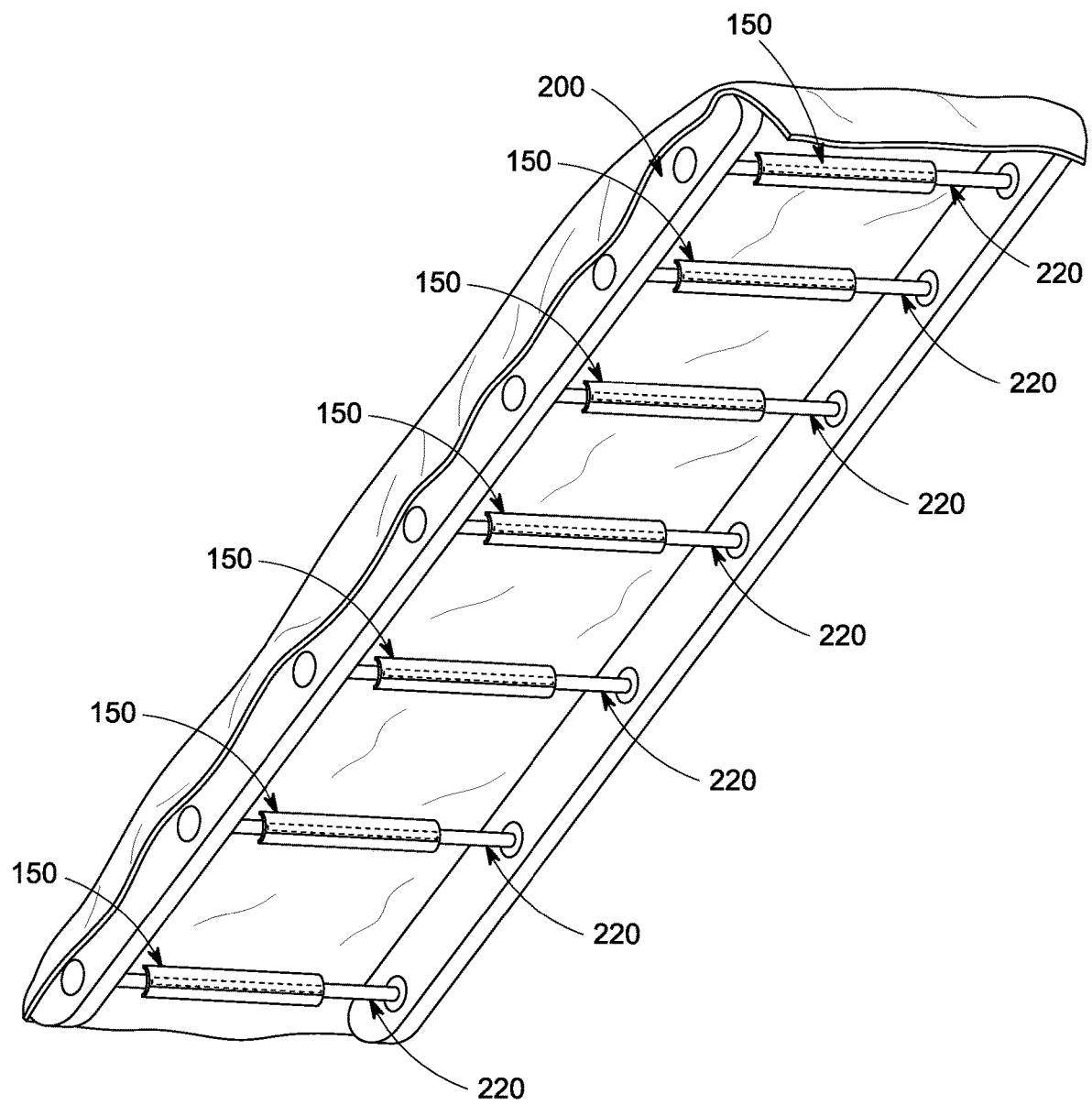
FIG. 9 shows a perspective bottom view illustrating the Animal Climbing Cover for Ladders attached to a ladder according to the alternate embodiment of the present invention of FIG. 8.
Figure 10:
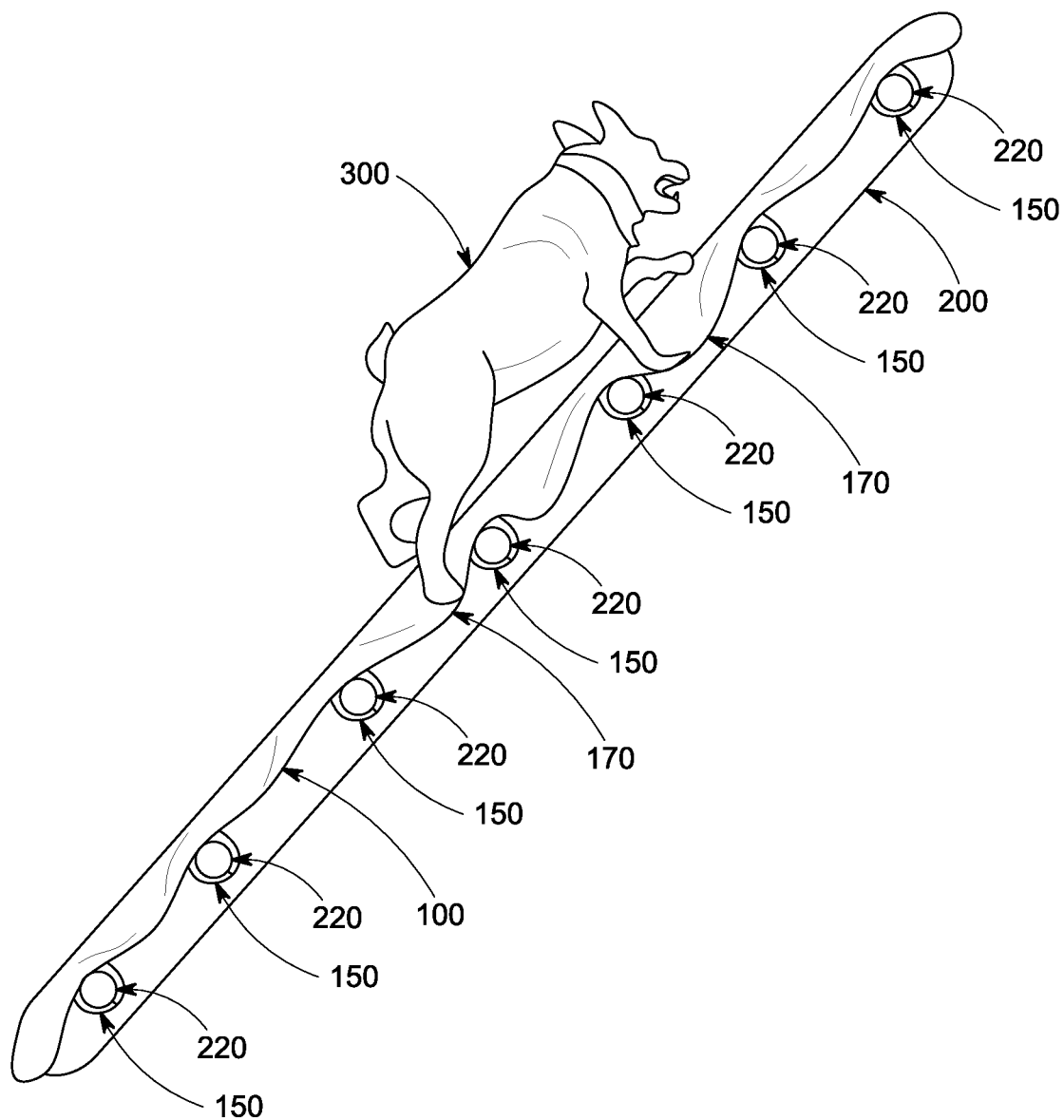
FIG. 10 shows a side view illustrating the Animal Climbing Cover for Ladders attached to a ladder and in use by an animal according to the alternate embodiment of the present invention of FIG. 8.

In an alternate embodiment, as shown in FIGS. 8-10, the main panel 110 of the animal climbing cover for ladders 100 is formed having a plurality of attachment members 150 attached to the bottom surface of the main panel at spaced locations along the length thereof, and are adapted to releasably attach the main panel to respective rungs 220 of the ladder 200. In this embodiment, the main panel 110 is sized, shaped, and adapted to form depressions 170 between respective rungs of the ladder when weight is placed upon the top surface of the main panel between the respective rungs by an animal, to thereby form and provide support surfaces for the animal to climb up and down the ladder. In this embodiment, the attachment bracket 120, the attachment strap 124, the horizontal straps 128 and rings 129 along with flexible cords 132 and 134 are not necessary but can be included as well.

The plurality of attachment members 150 can be formed as hook and loop fasteners, cordage, thread, clips, spring clips, or even fabric tubes including zippers, wherein each of the attachment members are adapted to releasably wrap around respective rungs of the ladder and securely and releasably attach the main panel to the ladder. Furthermore, and once again, the main panel 110 may be formed from plastic, burlap, fiberglass, rubber, or copper strands, but also may be formed from a material that is flexible and stretchable to help form depressions 170 when the animal presses down between rungs.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is:

1. An animal climbing cover for use upon a ladder comprising:
   a main panel comprising:
      a top edge portion;
      a bottom edge portion;
         wherein the distance between said top edge and said bottom edge defines a length of said main panel;
      two opposite side edge portions;
         wherein said two opposite side edge portions extend along said length of said main panel;
         wherein the distance between said two opposite side edge portions defines a width of said main panel;
      a top surface;
         wherein said top surface extends between said top edge portion, said bottom edge portion, and said two opposite side edge portions; and
      a bottom surface;
         wherein said bottom surface extends between said top edge portion, said bottom edge portion, and said two opposite side edge portions;
      wherein said main panel is sized, shaped, and adapted to cover a substantial portion of side rails and rungs of a ladder; and
   a plurality of attachment members;
      wherein said plurality of attachment members are attached to said bottom surface of said main panel at spaced locations along said length thereof, and are adapted to releasably attach said main panel to respective rungs of said ladder;
   wherein said main panel is sized, shaped, and adapted to form depressions between respective rungs of said ladder when weight is placed upon said top surface of said main panel between said respective rungs, to thereby form and provide support surfaces for an animal to climb up and down said ladder.

2. The animal climbing cover for ladders of claim 1, wherein said plurality of attachment members are chosen from a list of attachment members consisting of hook and loop fasteners, cordage, thread, and clips; wherein each of said attachment members are adapted to wrap around respective rungs of said ladder and securely and releasably attach said main panel to said ladder.

3. The animal climbing cover for ladders of claim 1, wherein said main panel further includes:
   a plurality of raised portions;
      wherein said plurality of raised portions are located at various positions upon said top surface of said main panel and are adapted to increase the friction between an animal's paws and the top surface of said main panel when said animal is climbing up and down said ladder.

4. The animal climbing cover for ladders of claim 1, further comprising:
   at least one attachment bracket;
      wherein said at least one attachment bracket is attached to said top edge portion of said main panel and is adapted to releasably and securely engage a top rung of said ladder; and
   at least one attachment strap;
      wherein said at least one attachment strap is attached to said bottom edge portion of said main panel and is adapted to releasably and securely engage a bottom rung of said ladder.

5. The animal climbing cover for ladders of claim 4, further comprising:
   at least one vertical strap including:
      a first end;
      a second end opposite said first end;
      wherein said at least one vertical strap is attached to said bottom surface of said main panel and extends along a substantial portion of said length of said main panel; and
      wherein said at least one vertical strap is adapted to increase the rigidity of said main panel when in use.

6. The animal climbing cover for ladders of claim 5, wherein said at least one attachment strap is also attached to said second end of said at least one vertical strap.

7. The animal climbing cover for ladders of claim 6, wherein said at least one attachment strap is adapted to releasably and securely engage said bottom rung of said ladder via a flexible cord.

8. The animal climbing cover for ladders of claim 1, wherein said at least one attachment bracket is attached to said top edge portion of said main panel via at least two spaced straps connected therebetween.

9. The animal climbing cover for ladders of claim 5, further comprising:
   a plurality of spaced horizontal straps, each including:
      a first end;
      a second end opposite said first end;
      a ring attached to said first end;
      a ring attached to said second end;
      wherein said plurality of spaced horizontal straps are attached to said bottom surface of said main panel spaced from one another; and
      wherein said plurality of spaced horizontal straps have a length larger than said width of said main panel, such that said first and second ends extend respectively past said two opposite side edge portions;
   a first side flexible cord including:
      a first end connected to said ring on said first end of one of said plurality of horizontal straps adjacent said top edge portion of said main panel;
      a second end connected to said ring on said first end of one of said plurality of horizontal straps adjacent said bottom edge portion of said main panel; and
      a center portion adapted to be releasably connected to said ring on said second end of one of said plurality of horizontal straps in between said one of said plurality of horizontal straps adjacent said top edge portion of said main panel and said one of said plurality of horizontal straps adjacent said bottom edge portion of said main panel; and
   a second side flexible cord including:
      a first end connected to said ring on said second end of one of said plurality of horizontal straps adjacent said top edge portion of said main panel;
      a second end connected to said ring on said second end of one of said plurality of horizontal straps adjacent said bottom edge portion of said main panel; and a center portion adapted to be releasably connected to said ring on said first end of one of said plurality of horizontal straps in between said one of said plurality of horizontal straps adjacent said top edge portion of said main panel and said one of said plurality of horizontal straps adjacent said bottom edge portion of said main panel;

wherein said plurality of spaced horizontal straps and said first and second side flexible cords are adapted and used such that said animal climbing cover is more securely removably attached to said ladder.

10. The animal climbing cover for ladders of claim 1, wherein said main panel is formed from a material chosen from a group of materials consisting of plastic, burlap, fiberglass, rubber, and copper strands.

11. The animal climbing cover for ladders of claim 5, wherein there are a plurality of spaced vertical straps.

12. The animal climbing cover for ladders of claim 3, wherein said plurality of raised portions are formed having a shape chosen from a group of shapes consisting of bumps and ridges.

13. A combination of a ladder and an animal climbing cover, said combination comprising:
    a ladder including:
        two spaced side rails; and
        a plurality of spaced rungs connected between said two spaced side rails; and
    an animal climbing cover comprising:
        a main panel comprising:
            a top edge portion;
            a bottom edge portion;
                wherein the distance between said top edge and said bottom edge defines a length of said main panel;
            two opposite side edge portions;
                wherein said two opposite side edge portions extend along said length of said main panel;
                wherein the distance between said two opposite side edge portions defines a width of said main panel;
            a top surface;
                wherein said top surface extends between said top edge portion, said bottom edge portion, and said two opposite side edge portions; and
            a bottom surface;
                wherein said bottom surface extends between said top edge portion, said bottom edge portion, and said two opposite side edge portions;
            wherein said main panel is sized, shaped, and adapted to cover a substantial portion of side rails and rungs of a ladder; and
        a plurality of attachment members;
            wherein said plurality of attachment members are attached to said bottom surface of said main panel at spaced locations along said length thereof, and are adapted to releasably attach said main panel to respective rungs of said ladder;
            wherein said main panel is sized, shaped, and adapted to form depressions between respective rungs of said ladder when weight is placed upon said top surface of said main panel between respective rungs, to thereby form and provide support surfaces for an animal to climb up and down said ladder.

14. The combination of claim 13, wherein said plurality of attachment members are chosen from a list of attachment members consisting of hook and loop fasteners, cordage, thread, and clips; wherein each of said attachment members are adapted to wrap around respective rungs of said ladder and securely and releasably attach said main panel to said ladder.

15. The combination of claim 13, wherein said main panel further includes:
    a plurality of raised portions;
        wherein said plurality of raised portions are located at various positions upon said top surface of said main panel and are adapted to increase the friction between an animal's paws and the top surface of said main panel when said animal is climbing up and down said ladder.

16. The combination of claim 13, further comprising:
    at least one attachment bracket;
        wherein said at least one attachment bracket is attached to said top edge portion of said main panel and is adapted to releasably and securely engage a top rung of said ladder; and
    at least one attachment strap;
        wherein said at least one attachment strap is attached to said bottom edge portion of said main panel and is adapted to releasably and securely engage a bottom rung of said ladder.

17. The combination of claim 13, further comprising:
    at least one vertical strap including:
        a first end;
        a second end opposite said first end;
        wherein said at least one vertical strap is attached to said bottom surface of said main panel and extends along a substantial portion of said length of said main panel; and
        wherein said at least one vertical strap is adapted to increase the rigidity of said main panel when in use.

18. The combination of claim 17, further comprising:
    a plurality of spaced horizontal straps, each including:
        a first end;
        a second end opposite said first end;
        a ring attached to said first end;
        a ring attached to said second end;
        wherein said plurality of spaced horizontal straps are attached to said bottom surface of said main panel spaced from one another; and
        wherein said plurality of spaced horizontal straps have a length larger than said width of said main panel, such that said first and second ends extend respectively past said two opposite side edge portions;
    a first side flexible cord including:
        a first end connected to said ring on said first end of one of said plurality of horizontal straps adjacent said top edge portion of said main panel;
        a second end connected to said ring on said first end of one of said plurality of horizontal straps adjacent said bottom edge portion of said main panel; and
        a center portion adapted to be releasably connected to said ring on said second end of one of said plurality of horizontal straps in between said one of said plurality of horizontal straps adjacent said top edge portion of said main panel and said one of said plurality of horizontal straps adjacent said bottom edge portion of said main panel; and
    a second side flexible cord including:
        a first end connected to said ring on said second end of one of said plurality of horizontal straps adjacent said top edge portion of said main panel;

a second end connected to said ring on said second end of one of said plurality of horizontal straps adjacent said bottom edge portion of said main panel; and a center portion adapted to be releasably connected to said ring on said first end of one of said plurality of horizontal straps in between said one of said plurality of horizontal straps adjacent said top edge portion of said main panel and said one of said plurality of horizontal straps adjacent said bottom edge portion of said main panel;

wherein said plurality of spaced horizontal straps and said first and second side flexible cords are adapted and used such that said animal climbing cover is more securely removably attached to said ladder.

19. The animal climbing cover for ladders of claim 1, wherein each of said plurality of attachment members are formed having an elongated tubular shape split along its length and adapted to be removably and securely placed around each of said respective rungs of said ladder.

20. The combination of claim 13, wherein each of said plurality of attachment members are formed having an elongated tubular shape split along its length and adapted to be removably and securely placed around each of said respective rungs of said ladder.

* * * * *